United States Patent
Wigemyr

(10) Patent No.: US 12,075,760 B2
(45) Date of Patent: Sep. 3, 2024

(54) FEEDING DEVICE FOR LIVESTOCK TRANSPORT TRAILERS

(71) Applicant: Ample Construction Ltd., Brooks (CA)

(72) Inventor: Dwight Wigemyr, Brooks (CA)

(73) Assignee: Ample Construction Ltd., Brooks, CA (US)

( * ) Notice: Subject to any disclaimer, the term of this patent is extended or adjusted under 35 U.S.C. 154(b) by 43 days.

(21) Appl. No.: 18/049,810

(22) Filed: Oct. 26, 2022

(65) Prior Publication Data

US 2023/0133591 A1 May 4, 2023

Related U.S. Application Data

(60) Provisional application No. 63/274,124, filed on Nov. 1, 2021.

(51) Int. Cl.
*A01K 5/00* (2006.01)

(52) U.S. Cl.
CPC .................. *A01K 5/008* (2013.01)

(58) Field of Classification Search
CPC . A01K 5/00; A01K 5/008; A01K 5/01; A01K 5/0114; A01K 5/0128
See application file for complete search history.

(56) References Cited

U.S. PATENT DOCUMENTS

| | | | | |
|---|---|---|---|---|
| 457,086 A * | 8/1891 | Ketchum | ............... | A01K 5/008 119/68 |
| 806,994 A * | 12/1905 | Pruser | ................... | A01K 5/008 119/68 |
| 812,157 A * | 2/1906 | Thompson | ............... | A01K 1/04 248/97 |
| 925,624 A * | 6/1909 | Colgan | ................... | A01K 5/008 119/68 |
| 936,975 A * | 10/1909 | Abel | ...................... | A01K 5/008 119/68 |
| 1,157,333 A * | 10/1915 | Snell | ...................... | F16M 11/10 248/315 |
| 3,490,726 A * | 1/1970 | Mills | ....................... | A01K 5/01 248/312.1 |

(Continued)

FOREIGN PATENT DOCUMENTS

| | | | | |
|---|---|---|---|---|
| CA | 2710924 A1 | 1/2012 | | |
| DE | 202005015584 U1 * | 3/2006 | ............. | A01K 5/008 |

(Continued)

*Primary Examiner* — Monica L Perry
*Assistant Examiner* — Aaron M Rodziwicz
(74) *Attorney, Agent, or Firm* — NGUYEN TARBET IP LAW

(57) ABSTRACT

A feeding device for preventing displacement of feed during livestock feeding inside a livestock trailer is described. The device includes a wall bracket configured for connection of the device to an interior surface of the trailer and a net frame having a net connected thereto. The net frame is connected to the wall bracket and pivotable from an elevated open position permitting the feed to be placed on a substantially flat manger surface of the trailer to a substantially horizontal closed position where the net covers the feed on the manger surface and permits the livestock feeding to occur through the net while the net prevents the displacement of the feed.

11 Claims, 4 Drawing Sheets

(56) References Cited

U.S. PATENT DOCUMENTS

| | | | | |
|---|---|---|---|---|
| 5,144,912 | A * | 9/1992 | Hammett | A01K 7/00 119/51.5 |
| 5,188,060 | A * | 2/1993 | Johnson | A01K 5/01 119/58 |
| 5,375,559 | A * | 12/1994 | Baadsgaard | A01K 5/01 119/58 |
| 5,501,176 | A * | 3/1996 | Tully | A01K 5/0114 119/61.57 |
| 6,789,504 | B1 * | 9/2004 | O'Neill | A01K 5/01 119/58 |
| 7,059,271 | B2 * | 6/2006 | Santa Cruz | A01K 5/01 119/60 |
| 7,895,974 | B2 | 3/2011 | Brickell | |
| 8,220,414 | B2 | 7/2012 | Pitkäranta | |
| 8,893,656 | B2 | 11/2014 | Pitkäranta | |
| 2005/0217593 | A1 * | 10/2005 | Rice | A01K 1/10 119/60 |
| 2008/0149040 | A1 | 6/2008 | Welchel et al. | |
| 2008/0156270 | A1 * | 7/2008 | Brickell | A01K 1/10 119/61.2 |
| 2008/0308044 | A1 * | 12/2008 | Tiemann | A01K 5/0114 119/61.5 |
| 2012/0234250 | A1 * | 9/2012 | Shamoon | A01K 5/0114 119/61.57 |
| 2012/0266824 | A1 * | 10/2012 | Trauttmansdorf | A01K 5/0114 119/65 |
| 2012/0285389 | A1 * | 11/2012 | Barz | A01K 5/0128 119/61.54 |
| 2013/0112148 | A1 * | 5/2013 | Warren | A01K 5/008 119/65 |
| 2016/0270367 | A1 * | 9/2016 | DeWitt | A01K 5/008 |
| 2017/0049073 | A1 * | 2/2017 | Barron | A01K 5/01 |
| 2017/0071150 | A1 * | 3/2017 | Abbey | A01K 7/00 |
| 2017/0245463 | A1 * | 8/2017 | Wold | A01K 1/0356 |
| 2019/0274281 | A1 * | 9/2019 | Byberg | A01K 5/01 |
| 2020/0037575 | A1 * | 2/2020 | Hotham | A01K 1/105 |
| 2020/0329668 | A1 | 10/2020 | Bulmer | |
| 2021/0176955 | A1 | 6/2021 | Davis | |

FOREIGN PATENT DOCUMENTS

| | | | | |
|---|---|---|---|---|
| DE | 202012001400 U1 * | 5/2012 | | A01K 5/01 |
| DE | 202012006649 U1 * | 9/2012 | | A01K 5/01 |
| EP | 3189728 A1 * | 7/2017 | | A01K 5/00 |
| FR | 2773667 A1 * | 7/1999 | | A01K 1/01 |
| GB | 2425928 A | 11/2006 | | |
| WO | WO-2017120255 A1 * | 7/2017 | | A01K 5/00 |

* cited by examiner

FEEDING DEVICE FOR LIVESTOCK TRANSPORT TRAILERS

CROSS-REFERENCE TO RELATED APPLICATIONS

This application claims priority from U.S. Provisional Application Ser. No. 63/274,124 filed on Nov. 1, 2021, the entire disclosure of which is incorporated herein by reference.

FIELD OF THE INVENTION

The invention relates to the field of livestock transport and more particularly to equipment used for maintaining feeding of livestock in transport trailers.

BACKGROUND

Transport trailers for livestock are in common use by owners of livestock. For example, equestrians will often transport horses to various competition sites or recreational areas. Such transport trailers are equipped with various amenities to minimize stress on the horses during transport and ensure that the horses can continue to be fed during transport.

Various feeding devices and systems have been developed to address various problems connected with feeding of livestock outdoors, in barns and other shelters and inside or outside of transport trailers. Some examples of such feeding devices and systems are described, for example in the following patent documents: GB 2,425,928, U.S. Pat. No. 8,220,414, US 2008/0149040, US 2021/0176955, US 2020/0329668, US 2016/0270367, U.S. Pat. Nos. 7,895,974, 8,893,656, US 2017/0049073, CA 2,719,924, and U.S. Pat. No. 1,191,442, each of which is incorporated herein by reference in its entirety.

There continues to be a need for improvements in feeding livestock inside livestock transport trailers.

SUMMARY

In accordance with one embodiment, there is provided a feeding device for preventing displacement of feed during livestock feeding inside a livestock trailer. The device includes a wall bracket configured for connection of the device to an interior surface of the trailer and a net frame having a net connected to the net frame. The net frame is pivotably connected to the wall bracket to pivot from an elevated open position permitting the feed to be placed on a substantially flat manger surface of the trailer to a substantially horizontal closed position where the net covers the feed on the manger surface and permits the livestock feeding to occur through the net while the net prevents the displacement of the feed.

In some embodiments, the interior surface of the trailer is a vertical interior wall of the trailer adjacent to the manger surface.

In some embodiments, the frame is shaped from a single frame member to include two rounded corners defining a pair of opposed outwardly extending portions with an intervening transverse portion.

In some embodiments, the net frame remains in contact with the manger surface when the device is in the closed position.

In some embodiments, the device further includes a retention mechanism for retaining the net frame in the open position and in the closed position. The retention mechanism may be provided by a gas spring connected between an end of the wall bracket and the net frame.

The net may be formed of flexible cord material. In some embodiments, the net covers at least about 80% of the area defined by the net frame.

In some embodiments, the net has a depth of about 4.5 inches to about 6 inches ((about 11 to about 15 cm).

According to another embodiment, there is provided a feeding device for preventing displacement of feed during livestock feeding inside a livestock trailer. The device includes a wall bracket configured for connection of the device to an interior surface of the trailer and a net frame bracket pivotably connected to the wall bracket. The net frame bracket is shaped to provide a pair of opposed outwardly extending arms and corresponding end portions with gaps. The device includes a net frame having a net connected to the net frame. The net frame has parallel arms configured to slide within the gaps of the net frame bracket to provide adjustable positions of the net frame. The net frame bracket is pivotable from an elevated open position permitting the feed to be placed on a substantially flat manger surface of the trailer to a substantially horizontal closed position where the net covers the feed on the manger surface which permits the livestock feeding to occur through the net while the net prevents the displacement of the feed.

In some embodiments, the arms of the net frame bracket each have a slot formed therein to permit sliding of corresponding set bolts connected to the net frame and to permit fixing of the set bolt to retain the net frame in a fixed position with respect to the arms of the net frame bracket.

In some embodiments, the interior surface of the trailer is a vertical interior wall of the trailer adjacent to the manger surface.

In some embodiments, the frame is shaped from a single frame member to include two rounded corners defining a pair of opposed outwardly extending portions with an intervening transverse portion.

In some embodiments, the arms of the net frame bracket remain in contact with the manger surface when the device is in the closed position.

In some embodiments, the device further includes a retention mechanism for retaining the net frame in the open position and in the closed position. The retention mechanism may be a gas spring connected between an end of the wall bracket and an end of one of the arms.

According to another embodiment, there is provided a kit for constructing and installing a feeding device. The kit includes as separated components: the wall bracket as described herein, the net frame as described herein, the net as described herein and instructions for construction and installation of the device on an interior surface of a livestock transport trailer. In some embodiments, this kit further includes a gas spring and instructions for installing the gas spring between the wall bracket and the net frame.

According to another embodiment, there is provided a kit for constructing and installing a device which includes an adjustable net frame with a net frame bracket. The kit includes separated components: the wall bracket as described herein, the net frame bracket as described herein, the net frame as described herein, the net as described herein, and instructions for construction and installation of the device on an interior surface of a livestock transport trailer. In some embodiments, this kit includes a gas spring and instructions for installing the gas spring between the wall bracket and the net frame bracket.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Wherever possible, similar reference numerals are used to indicate components having similar features or functionality.

DETAILED DESCRIPTION

Introduction and Rationale

Figure 1B:
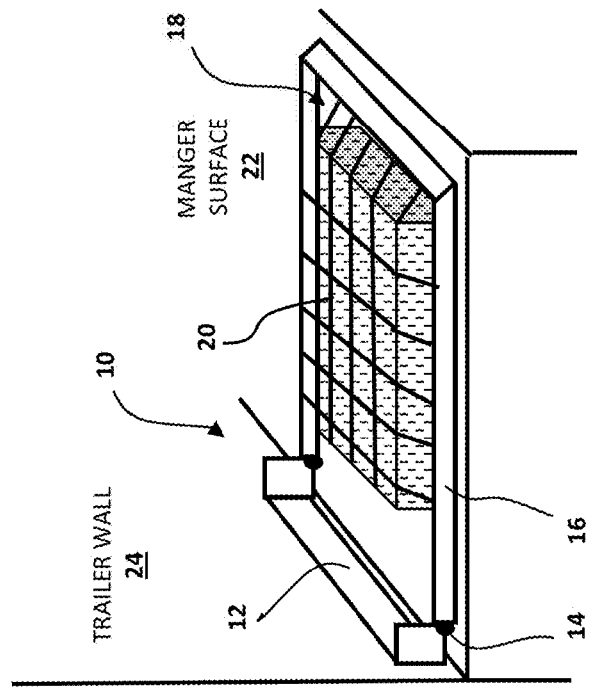
FIG. 1B is a schematic perspective illustration of the first embodiment of a feeding device 10 shown in the closed position which permits coverage of the feed 20 with a net 18.

Transport trailers for transporting livestock such as horses and cows are in widespread use. One problem connected with feeding of livestock inside a transport trailer is that when the livestock eats the feed, (typically hay, alfalfa or similar feed material) gets displaced from the platform provided inside a trailer for supporting feed (which is known as a "manger"). Once displaced, the feed gets trampled by the livestock, making a mess, and generating waste. The inventors have also noted that this trampling of feed also creates airborne fibre particulates which may be inhaled by the livestock and cause discomfort or health problems to the livestock as well as the handlers when the trailer is being cleaned.

There are two known solutions to this problem, neither of which are satisfactory. One solution is to provide the feed inside a mesh bag and place the bag on the manger surface. Livestock can eat the feed through the mesh without spilling the feed throughout the trailer. However, it is time consuming to pack the mesh bag with the feed and this extra time requirement is a significant disadvantage. In addition, the mesh bag may be displaced from the manger surface, making it difficult or impossible for the livestock to reach, to continue feeding. Another solution to the problem is to place an open-topped container on the surface of the manger. However, the container may also become dislodged and there remains some extent of feed being displaced from an open-topped container. To address this issue, systems have been developed where the container is held in place by straps. This is also unsatisfactory as the livestock will sometimes chew on the straps or get tangled in the straps.

The present inventor has developed a mechanical feeding device which addresses these problems in a more effective manner. Embodiments of the feeding device described herein can be used to retrofit a trailer with a feeding system that prevents the problems of debris caused by livestock feeding inside a livestock transport trailer. Alternative embodiments may be included as standard equipment by livestock transport trailer manufacturers. Embodiments of the feeding device operate between an open position, where an appropriate volume of feed may be placed on the manger surface, and a closed position where a net covers the feed with sufficient retention force that the livestock cannot dislodge the net, while permitting the livestock to eat the feed through the net. The compact profile of the feeding device is arranged to minimize opportunities for the livestock to come into contact with the feeding device, other than the net portion of the feeding device which covers the feed.

Advantageously, in some embodiments, the net is dimensioned to provide sufficient volume to contain a suitable volume of feed, such as one to three "flakes" of feed. As used herein, the term "flake of feed" refers to a portion of a feed material such as hay, alfalfa or other feed crop which is pre-formed during the baling process to facilitate removal of a convenient portion of feed from the bale. Different baling techniques used in different geographical regions may result in different flake volumes and the volume of the net and the frame used to support the net may be altered in construction of alternative embodiments of the feeding device to accommodate these different volumes. The ability for the livestock handler to simply dislodge one to three flakes of feed from a bale, place them on the manger in a livestock trailer and close the feeding device to place the net over the feed provides a secure feeding system with minimal preparation time.

DESCRIPTION OF EXAMPLE EMBODIMENTS

Various aspects of the invention will now be described with reference to the figures. For the purposes of illustration, components depicted in the figures are not necessarily drawn to scale in all cases. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Figure 1A:
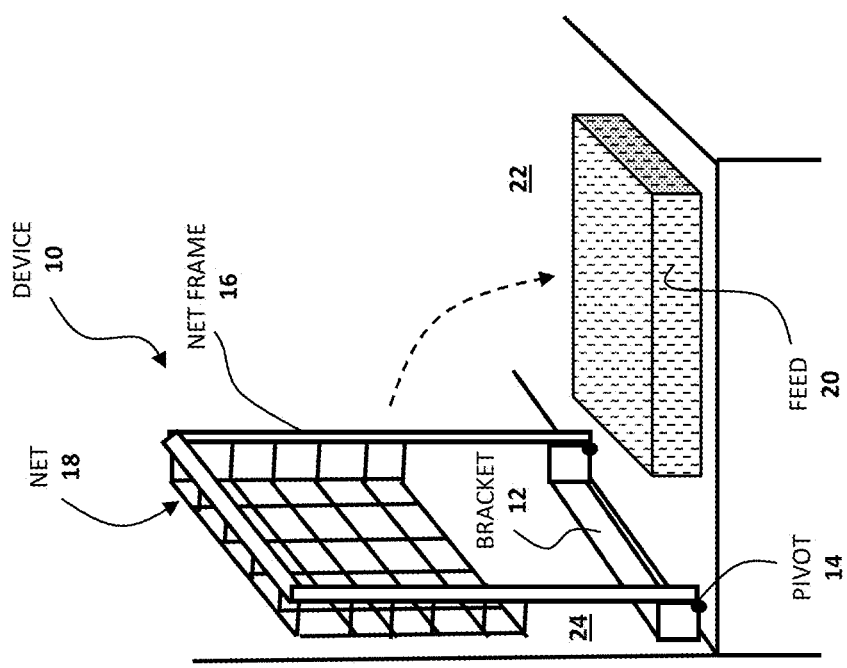
FIG. 1A is a schematic perspective illustration of a first embodiment of a feeding device 10 shown in the open position which permits placement of feed 20 on a manger surface 22 inside a livestock transport trailer.

A first general embodiment of a feeding device 10 is illustrated in FIGS. 1A and 1B to demonstrate an overview of operation of the device 10 in context of its working environment. FIG. 1A illustrates a perspective view of the feeding device 10 which is mounted to an interior vertical wall 24 of a livestock trailer via a wall bracket 12. A pivot 14 connects the bracket to a net frame 16. A net 18 is connected to the net frame 16. In the illustrations shown in FIGS. 1A and 1B, the net 18 has the appearance of a rigid screen to preserve clarity. However, in preferred embodiments (see for example FIG. 5), the net is formed of flexible material woven from flexible natural or synthetic polymers such that it will conform to the shape of the feed 20 which it is intended to cover. In FIG. 1A, the feeding device 10 is in the open position, permitting a portion of feed 20 to be placed on a manger surface 22. The pivot 14 permits the net frame 18 to be pulled down towards the manger surface 22 to cover the feed 20 as shown in FIG. 1B.

Figure 2:
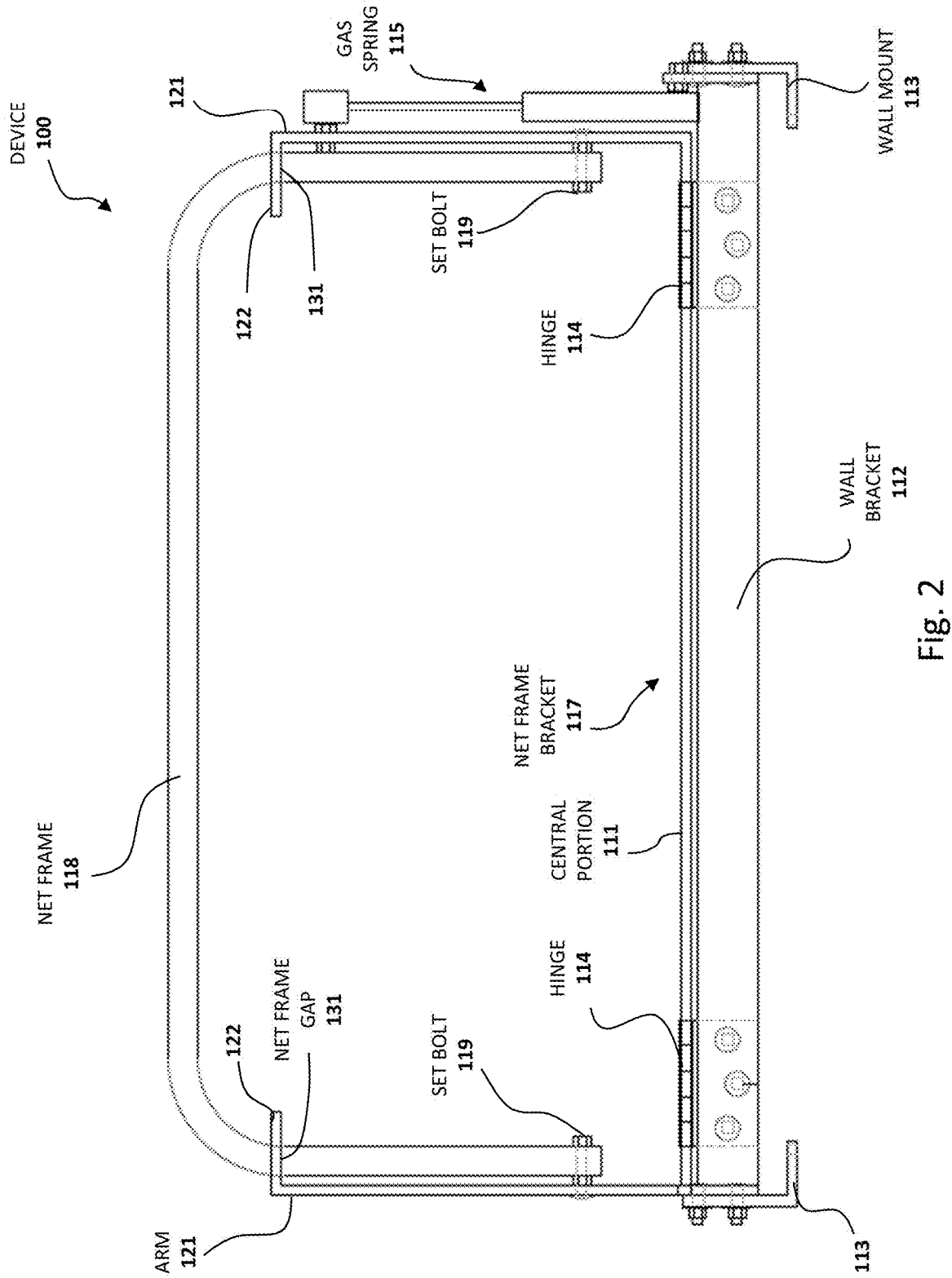
FIG. 2 is a side elevation view from the back side of another embodiment of a feeding device 100.
Figure 3:
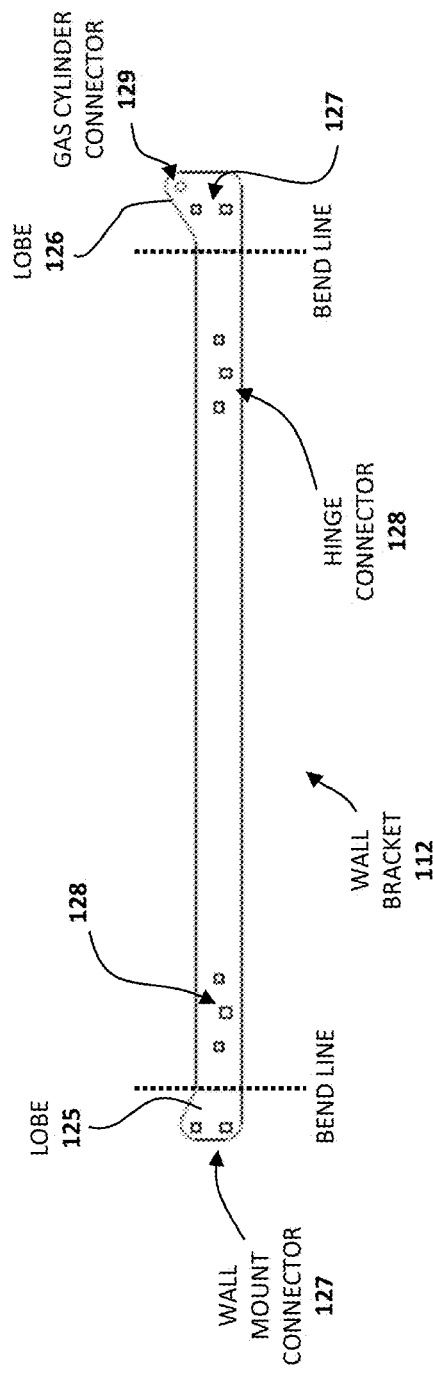
FIG. 3 is a side elevation view of the wall bracket 112 of the feeding device showing bend lines which divide the main body of the wall bracket 112 from the end lobes 125, 126.
Figure 4:
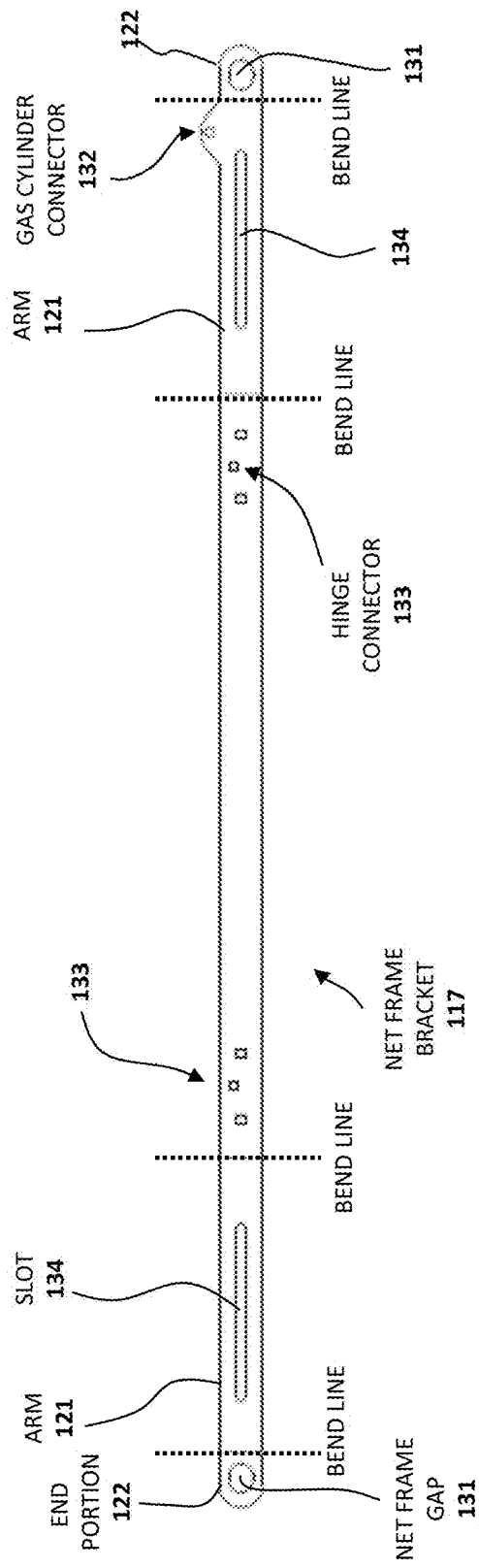
FIG. 4 is a side elevation view of the net frame bracket 117, showing bend lines which divide the main body of the net frame bracket 117 from the arms 121 of the net frame bracket 117 and the extension with the net frame gap 131.
Figure 5:
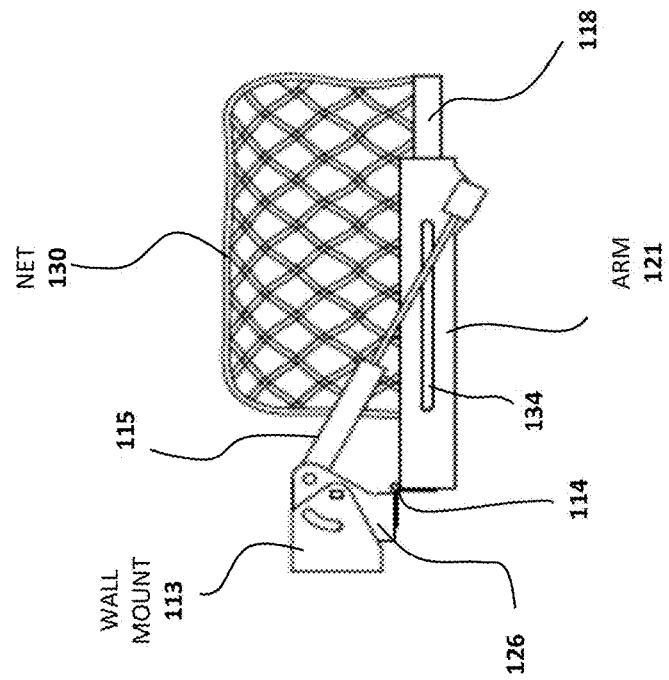
FIG. 5 is a scheme showing side elevation views of the feeding device 100 in the elevated open position (left) which permits feed (not shown) to be placed below the net frame 118 and the closed position where the net 130 is extended to cover the feed.
Figure 5:
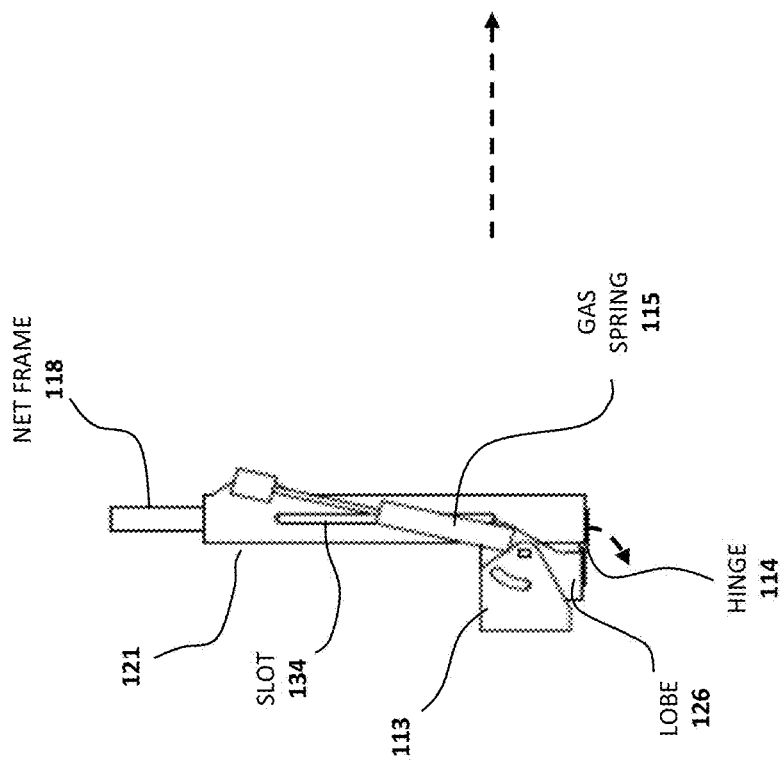

Another embodiment of the feeding device 100, and selected isolated components thereof are illustrated in FIGS. 2 to 5. FIG. 2 is a back side elevation view of a feeding device 100 in the open position, with the net omitted to preserve clarity. It is to be understood that a net is connected to the net frame 118 such that it covers at least about 80% of the area between the parallel members of the net frame 118 with coverage provided at the transverse portion of the net frame between the parallel members. In the closed position (not shown in FIG. 2) the net frame 118 would extend out of the back of the plane of the page following pivoting on the hinges 114. It is to be understood that the net is attached only to the net frame 118, which in this embodiment is formed of a single elongated hollow bar of metal such as aluminum or lightweight stainless steel, for example, or alternatively formed of a thermoplastic polymer. The corners of the net frame 118 are rounded to avoid the presence of sharp corners to facilitate convenient attachment of the net to the net frame 118 to avoid tangling of the net at the corners during movement of the net which occurs during operation of the feeding device 100. The wall bracket 112 is connected to the wall (not shown) via a pair of wall mounts 113 connected to the ends of the wall bracket 112. The hinges 114 act as the pivotable connections between the wall bracket 112 and a net frame bracket 117, which is formed of a single flat piece of metal with bends to form a central portion 111 with two opposed arms 121. The opposed arms 121 are further shaped to define end portions 122 having gaps 131 formed therein. It is to be understood that the parallel portions of the net frame 118 can slide through the gaps 131 in order to provide adjustability in positioning of the net frame and net. This is an advantageous feature when the feeding device is used to retrofit trailers having mangers with different widths because it permits the net frame to be closed at different positions within the width of the manger. As shown in FIGS. 4 and 5, the arms 121 are each provided with a slot 134. FIG. 2 indicates that a set bolt 119 can be used to fix the position of the net frame 118 in the slots 134 with respect to the arms 121 of the net frame bracket 117. In a situation where a manger with a reduced width dimension is provided in a livestock trailer, the net frame 118 would be retracted for maximal overlap with the arms 121 of the net frame bracket 117 to keep the inside of the net frame 118 close to the vertical wall of the trailer. Conversely, a manger with a greater width dimension could make it advantageous to extend the parallel portions of the net frame 118 outward for less overlap to extend the reach of the net frame 118 towards an outer edge of the manger.

FIG. 2 shows that a gas spring 115 is located on the right side of the feeding device 100. As used herein, the term "gas spring" is synonymous with other known terms used to describe this component, such as "gas cylinder" or "lift support" which is a feeding device that stores energy by compressing gas contained therein. In general terms, a gas spring includes a rod attached to a piston, moving within a sealed cylinder containing pressurized nitrogen gas and oil. The force provided by a gas spring is equal to the pressure differential between internal and external (environment) pressures, acting on the cross-sectional area of the rod. In the feeding device embodiment 100 The gas spring 115 is connected between an upper part of an end lobe 126 of the wall bracket 112 (see FIG. 3) and an outer end of the corresponding arm 121 of the net frame bracket 117. The gas spring 115 provides retention of the net frame 118 in the open (elevated) position (see left side of FIG. 5) and also holds the net frame 118 against the manger surface when the feeding device 100 is in the closed position.

Retention of the net frame 118 in the open position without requiring any steps to operate another retention mechanism is convenient for the user. Retention of the net frame 118 against the upper surface of the manger in the closed position prevents the net frame 118 from becoming dislodged during livestock feeding. The gas spring 115 is in the retracted position when the feeding device 100 is in the open position and in the extended position when the feeding device 100 is in the closed position. Other mechanisms for retaining the arms 121 of the net frame bracket 117 and the net frame 118 in the elevated position may be provided in alternative embodiments. For example, in alternative embodiments if a mechanism with a biasing force such as a gas spring is not incorporated into the feeding device, the net frame may be held in the elevated position using a cord or strap connected to the vertical wall of the trailer. This modification would decrease the cost of manufacturing the feeding device, but it would be significantly less convenient because it would require an extra operational step to retain the net frame in the open elevated position. While a gas spring is not illustrated in the embodiment 10 shown in FIGS. 1A and 1B (which does not include a net frame bracket), it is to be understood that this embodiment 10 is compatible with modification to include a gas spring connected between an end of the wall bracket 12 and a location adjacent to an outer end of the net frame 18.

FIG. 3 is a side elevation view of the wall bracket 112 of feeding device embodiment 100 which the inventor has recognized is convenient to form from a single flat piece of metal such as aluminum or lightweight stainless steel for example. In other embodiments the wall bracket may be formed of a thermoplastic polymer. FIG. 3 shows hinge connectors 128, in the form of holes for fasteners formed in the main segment of the wall bracket 112. The ends of the wall bracket 112 are shaped as lobes which are bent by about 90 degrees from the main segment along the bend lines shown. Left lobe 125 includes wall mount connectors 127 (holes for fasteners) and right lobe 126 also has similar wall mount connectors 127 and a gas cylinder connector 129 (hole for a fastener).

FIG. 4 is a side elevation view of the net frame bracket 117 of feeding device embodiment 100, which is also formed from a single flat piece of metal such as aluminum, lightweight stainless steel or a thermoplastic polymer. FIG. 4 shows hinge connectors 133 (holes for fasteners) formed in the main segment of the net frame bracket 117. The two interior bend lines are used to form the arms 121 and the two outer bend lines generate the end portions 122 which include the net frame gaps 131 for sliding the parallel portions of the net frame 118 to provide the width adjustment described above. The right-side arm includes an additional lobe including a connector 132 for the gas cylinder 115.

The inventor has recognized that it is advantageous to provide embodiments of the feeding device with a net dimensioned to cover an amount of feed which is suitable for consumption by livestock at a particular feeding time. For example, in embodiment 100, the net is provided with sufficient volume to effectively cover one to three flakes of feed, each having a depth of about 1.5 to about 2 inches (about 3.8 cm to about 5.1 cm). While flakes of feed may differ in dimension according to different baling techniques used in different geographical regions, in the inventor's experience, an appropriate net depth is about 4.5 inches to about 6 inches (about 11 to about 15 cm) to provide effective coverage of one to three flakes of feed. In some embodiments, the net covers at least about 80% of the area defined by net frame 118. In embodiment 100, the width of the net frame (between the parallel members of the net frame 118) is about 10 to about 12 inches (about 25.4 cm to about 30.5 cm) and the length of the frame is about 23 inches to about 28 inches (about 58.4 cm to about 71.1 cm). In embodiment 100, the length of the main segment of the wall bracket is about 26 to about 30 inches (about 66.0 cm to about 76.2 cm). In embodiment 100, the length of the opposed arms 121 off the net frame bracket 117 segment are about 9 inches to about 11 inches (about 22.9 cm to about 28.0 cm). In embodiment 100 the length of the gas spring 115 is about 10 inches (about 25.4 cm) in the closed (retracted position).

Kit for Retrofitting a Livestock Trailer with a Feeding Device

Another aspect of this technology is a commercial kit for retrofitting a livestock trailer with embodiments of the feeding device described herein. The kit may be provided in a disassembled form to include separate parts of the wall bracket, the net frame bracket, if applicable. The net may be pre-installed on the net frame or may be provided separately with instructions for connection of the net to the net frame. In embodiments including a gas spring, the gas spring may be included in the kit with instructions for installation of the gas spring between the wall bracket and the net frame. Instructions for installing the wall bracket on an interior vertical surface of the livestock trailer, followed by mounting of the net frame and net frame bracket, if applicable, may be included in the kit. Instructions for connecting the gas spring between the wall bracket and the net frame bracket, or between the wall bracket and the net frame may be included in the kit. Instructions for installing pivots such as hinges between the wall bracket and the net frame bracket, or between the wall bracket and the net frame bracket may be included in the kit.

In some embodiments, the kit may include one or more additional nets to install on the net frame as replacement nets. The kit may include fasteners such as bolts or screws for connecting the components together to form the feeding device.

In some embodiments, the kit includes a stencil for marking positions on an interior wall of a trailer for mounting of the wall bracket or wall mounts for connecting to the wall bracket.

In some embodiments, the kit includes instructions for assembling a feeding device with a net frame bracket having opposed parallel arms which permit the net frame to extend outward and provide adjustability for mangers having different lengths extending outward from the interior vertical wall of the livestock trailer. In these kit embodiments, the kit includes instructions for sliding the opposed arms of the net frame with respect to the arms of the net frame bracket and for fixing the net frame in place using set bolts passing through slots formed in the arms of the net frame bracket.

EQUIVALENTS AND SCOPE

Other than described herein, or unless otherwise expressly specified, all numerical ranges, amounts, values, and percentages in the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques.

Any patent, publication, internet site, or other disclosure material, in whole or in part, which is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

Unless otherwise defined, all technical and scientific terms used herein have the same meaning as commonly understood by one of ordinary skill in the art to which this technology belongs.

While this technology has been particularly shown and described with references to embodiments thereof, it will be understood by those skilled in the art that various changes in form and details may be made therein without departing from the scope of the technology encompassed by the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context.

It is also noted that the term "comprising" is intended to be open and permits but does not require the inclusion of additional elements or steps. When the term "comprising" is used herein, the term "consisting of" is thus also encompassed and disclosed. Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the technology, to the tenth of the unit of the lower limit of the range, unless the context clearly dictates otherwise. Where the term "about" is used, it is understood to reflect +/−10% of the recited value. In addition, it is to be understood that any particular embodiment of the present technology that falls within the prior art may be explicitly excluded from any one or more of the claims. Since such embodiments are deemed to be known to one of ordinary skill in the art, they may be excluded even if the exclusion is not set forth explicitly herein.

The invention claimed is:

1. A feeding device for preventing displacement of feed during livestock feeding inside a livestock trailer, the device comprising:
   a wall bracket configured for connection of the device to an interior surface of the trailer, a net frame bracket pivotably connected to the wall bracket, the net frame bracket shaped to provide a pair of opposed outwardly extending arms and corresponding end portions with gaps;

a net frame having a net connected thereto, the net frame having parallel arms configured to slide within the gaps of the net frame bracket to provide adjustable positions of the net frame;

wherein the net frame bracket is pivotable from an elevated open position permitting the feed to be placed on a flat manger surface of the trailer to a closed position where the net covers the feed on the manger surface which permits the livestock feeding to occur through the net while the net prevents the displacement of the feed.

2. The device of claim 1, wherein the arms of the net frame bracket each have a slot formed therein to permit sliding of corresponding set bolts connected to the net frame and to permit fixing of the set bolt to retain the net frame in a fixed position with respect to the arms of the net frame bracket.

3. The device of claim 1, wherein the interior surface of the trailer is a vertical interior wall of the trailer adjacent to the manger surface.

4. The device of claim 1, wherein the frame is shaped from a single frame member to include two rounded corners defining a pair of opposed outwardly extending portions with an intervening transverse portion.

5. The device of claim 1, wherein the arms of the net frame bracket remain in contact with the manger surface when the device is in the closed position.

6. The device of claim 1, further comprising a retention mechanism for retaining the net frame in the open position and in the closed position.

7. The device of claim 6, wherein the retention mechanism is a gas spring connected between an end of the wall bracket and an end of one of the arms.

8. The device of claim 1, wherein the net is formed of flexible cord material.

9. The device of claim 1, wherein the net covers at least about 80% of the area defined by the net frame.

10. The device of claim 1, wherein the net has a depth of about 4.5 inches to about 6 inches ((about 11 to about 15 cm).

11. A kit for constructing and installing a device according to claim 1 comprising, as separated components:
    the wall bracket as recited in claim 1;
    the net frame bracket as recited in claim 1;
    the net frame as recited in claim 1;
    the net as recited in claim 1; and
    instructions for construction and installation of the device on an interior surface of a livestock transport trailer.

* * * * *